United States Patent Office 3,417,074
Patented Dec. 17, 1968

3,417,074
METALLIFEROUS MONO AZO DYESTUFFS
Rudolf Kühne and Fritz Meininger, Frankfurt am Main, Walter Noll, Bad Soden, Taunus, and Helmut Rinno and Siegfried Schiessler, Frankfurt am Main, Germany, assignors to Farbwerke Hoechst Aktiengesellschaft vormals Meister Lucius & Brüning, Frankfurt am Main, Germany, a corporation of Germany
No Drawing. Continuation-in-part of application Ser. No. 219,137, Aug. 24, 1962. This application May 4, 1965, Ser. No. 453,201
Claims priority, application Germany, Aug. 26, 1961, F 34,783
6 Claims. (Cl. 260—151)

ABSTRACT OF THE DISCLOSURE

Fibre-reactive copper, cobalt, nickel and chromium monoazo- and disazo dyestuffs containing, as reactive moieties, one grouping of the formula

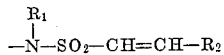

wherein $R_1$ is alkyl of 1 to 5 carbon atoms or cyclohexyl, and $R_2$ is hydrogen or alkyl of 1 to 5 carbon atoms, said dyestuffs being suitable for the dyeing or printing of textile fibrous materials consisting of cellulose, wool, silk or polyamides.

---

This application is a continuation-in-part of our application Ser. No. 219,137 filed Aug. 24, 1962, now abandoned.

The present invention relates to metalliferous azo-dyestuffs and to a process for preparing them; more particularly it relates to complex metal compounds of azo-dyestuffs having the general formula

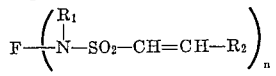

in which F represents the radical of an azo-dyestuff molecule containing a grouping capable of forming metal complexes and at least one group imparting solubility in water, $R_1$ represents an aliphatic or cycloaliphatic hydrocarbon radical, and $R_2$ represents hydrogen or an aliphatic hydrocarbon radical, and $n$ stands for an integer.

Especially, the present invention relates to copper, cobalt, nickel or chromium compounds of azo-dyestuffs having the formula

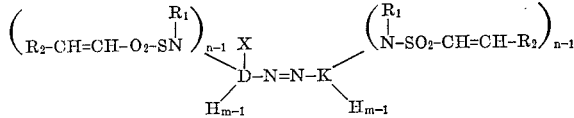

wherein $R_1$ represents cyclohexyl or alkyl having 1 to 5 carbon atoms; $R_2$ represents hydrogen or alkyl having 1 to 5 carbon atoms; $n$ and $m$ are each an integer from 1 to 2 inclusive, the sum of $n+m$ being 3 and at least one grouping

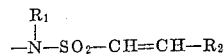

being present in the dyestuff molecule; D represents a radical of benzene, benzene sulfonic acids, lower alkoxy benzenes, chlorobenzene sulfonic acids, acetylamino benzene sulfonic acids, nitrobenzene sulfonic acids, or naphthalene sulfonic acids; X, which is bonded to an aromatic nucleus of D in a position adjacent to the azo group, represents hydroxyl, lower alkoxy or carboxyl; and K represents the radical of a coupling component of the group consisting of (a) 1-phenyl-5-pyrazolones substituted in the 3-position by —$CH_3$ or —COOH, (b) 1-phenyl-3-methyl-5-pyrazolones substituted on the phenyl group by —Cl, —$CH_3$ or —$SO_3H$, (c) naphthalene sulfonic acids substituted by hydroxyl, amino, acetylamino, benzoylamino, methylamino or carboxyphenylamino groups, (d) aminobenzenes substituted by amino, hydroxyl or —$SO_3H$, (e) an acetoacetylaminobenzene sulfonic acid, (f) phenylazo naphthalenes substituted on the naphthalene nucleus by hydroxyl or sulfonic acid groups, (g) phenylazo-hydroxyaminonaphthalenes substituted on the phenyl nucleus by hydroxyl or sulfonic acid groups, (h) hydroxyazobenzene sulfonic acid, and (i) 3 - aminophenyl - 5 - (1' - amino - 8' - hydroxyl - 3', 6'-disulfonaphthalene)-triazines substituted in the 1-position of the triazine ring by —Cl or —$OCH_3$;

the molar ratio between the meal and azo-dyestuff being 1:1 for copper, cobalt, nickel, and chromium, and 1:2 for cobalt and chromium, and said compound containing at least one sulfonic acid or carboxylic acid group.

We have found that novel valuable complex metal compounds of azo-dyestuffs are obtained by reacting azo-dyestuffs containing a grouping which is able to form a metal complex and at least one group imparting solubility in water and once or several times the group

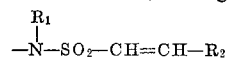

in which $R_1$ represents an aliphatic or cycloaliphatic hydrocarbon radical and $R_2$ represents hydrogen or an aliphatic hydrocarbon radical with agents yielding metal.

As groups imparting solubility in water there are especially used carboxylic acid or sulfonic acid groups. These groups may be distributed optionally in the dyestuff molecule, for example in such a maner that only one component used for the preparation of dyestuff or both components contain at least one carboxylic acid or sulfonic acid group.

As starting materials there are suitable on principle all azo compounds which are able to form complex metal dyestuffs as fars as they contain once or several times the vinylsulfonylamino group of the above formula, for example o.o'-dihydroxyazodyestuffs, o-hydroxy-o'-aminoazodyestuffs, o-amino-o'-carboxyazo-dyestuffs, o-hydroxy-o'-carboxyazo-dyestuffs as well as o-hydroxy-o'-alkoxy-azo-dyestuffs or o-hydroxy-o'-(o-carboxymethoxy)-azo - dyestuffs which, with the formation of metal complexes, change to o.o'-dihydroxyazo-dyestuffs and o-hydroxyazo-dyestuffs which with the oxidizing metallization change to o.o'-dihydroxyazo-dyestuffs.

As starting materials there may also be used azo-dyestuffs containing once or several times the group

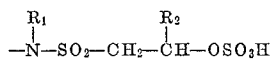

in which $R_1$ and $R_2$ have the meanings described above. These dyestuffs are converted at room temperature or at an elevated temperature into dyestuffs containing the vinylsulfonylamino group by treating with agents having an alkaline reaction. The alkali treatment can be carried out before, during or after the formation of the complex metal dyestuffs.

The starting materials free from metal can be prepared according to known methods by coupling for example o-hydroxy or o-carboxy diazo compounds of the benzene or naphthalene series with coupling components coupling in a position adjacent to a hydroxy group or to an enolizable keto group or in a position adjacent to an amino group. The choice of the diazo and coupling components used for the formation of dyestuff should be made in such a manner that the finished dyestuff contains at least one substituent of the above-mentoined formula and additionally at least one acid group imparting solubility in water.

The o.o'-dihydrazo-dyestuffs mentioned as starting materials can also be prepared indirectly by coppering the corresponding o-hydroxy-o'-alkoxyazo-dyestuffs to become dealkylated or by treating o-hydroxyazo-dyestuffs containing one of the above-mentioned ethionylamino groups and in addition thereto a free o'-position in a weakly acid solution with copper salts and an oxidizing agent. The complex compounds so obtained can, subsequently, be decoppered, for example, by treating with strong mineral acid or hydrogen sulfide and converted into the o.o'-dihydroxyazo-dyestuffs desired.

According to the process of the present invention the azo-dyestuffs of the formula mentioned above used as starting materials are reacted with an agent yielding metal. The reaction of the agent yielding metal with the starting materials can also be effected with dyestuffs as they are included in the coupling mixture.

As agents yielding metal there are used, for example, salts of manganese, iron, aluminum, especially, however, salts of cobalt, chromium, copper and nickel such as chromium sulfate, cobalt acetate, cobalt sulfate, copper acetate or copper sulfate. There may also be used agents yielding metal which contain the metal bound in a complex form, for example, complex chromium compounds of organic hydroxycarbxylic acids such as, for example, salicyclic acid, or complex cobalt or copper compounds of the alkali metal salts of aliphatic hydroxycarboxylic acids such as lactic acid and especially tartaric acid, for example sodium copper tartrate.

The reaction of the starting deystuffs with the agents yielding metal can be effected, for example, in such a manner that the aqueous preparation mixture is heated in a weakly acid, neutral or alkaline medium to temperatures between 20° and 130° C., if desired under reflux or in a closed vessel. If necessary, there may also be added organic solvents, such as tetrahydrofurane or dioxane.

In the complex metal dyestuffs obtained according to the present invention the molar ratio of metal:monoazo dyestuff is 1:1 when the metals are copper or nickel, and 1:1 or 1:2 when the metals are cobalt or chromium. In the form of their alkali metal salts the complex metal dyestuffs obtainable according to the invention are readily soluble in water. They are suitable for dyeing and printing various materials such as wool or polyamide fibers, advantageously, however, textile materials containing cellulose such as regenerated cellulose, linen, cellulose or especially cotton. The novel dyestuffs are suitable for dyeing materials containing cellulose according to the direct dyeing method, the padding-steaming process or the printing process. With the aid of acid-binding agents the dyestuffs are fixed on the textile materials to be dye, if desired in the hot. This process can be carried out in such a manner that the dyed textile material is after-treated with an acid-binding agent or that the acid-binding agent is caused to act upon the textile material before or during the treatment with the dyestuff. The dyeings and prints obtained with the novel azo-dyestuffs are distinguished by a high tinctorial strength, a good to very fasteness to light and outstanding properties of wet fastness particularly against vigorous washing. The novel dyestuffs of the present invention containing the group

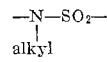

are, in particular, superior to dyestuffs of similar structure which contain the group

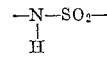

with regard to the color strength, the brillancy of tint and the stability to weak alkali of the cotton dyeings.

The following examples serve to illustrate the invention but they are not intended to limit it thereto, the parts and percentages being by weight unless otherwise stated and the relationship of parts by weight to parts by volume being the same as that of the kilogram to the liter.

EXAMPLE 1

228 parts of 1-hydroxy-2-amino-4-N-methyl-N-vinylsulfonylaminobenzene were diazotized at 0° to 5° C. in 1000 parts by volume of water and 1500 parts by volume of 2 N-hydrochloric acid with 200 parts by volume of 5 N-sodium nitrite solution and subsequently a pH-value of 5 to 6 was adpusted by strewing in sodium bicarbonate. 361 parts of 1-acetylamino-8-hydroxynaphthalene-3,6-disulfonic acid were dissolved in 1500 parts by volume of water, neutralized with sodium hydroxide solution and coupled with the solution of the diazonium salt. The mixture was stirred at 40° C. and a pH-value of 4 to 6.5 was maintained by the addition of soidum bicarbonate until the coupling was complete. The dyestuff obtained was salted out with sodium chloride, suctionfiltered and dried.

99 parts (of 65% strength calculated on the sodium salt) of the o.o'-dihydroxyazo-dyestuff obtained were dissolved in 1000 parts by volume of water. Subsequently 26 parts of crystallized copper sulfate and 34 parts of crystallized sodium acetate were added and the mixture was heated to 60° to 65° C. until the reaction was complete. The dyestuff containing copper was isolated by evaporating the mixture at 50° C. It was a black powder which, when printed on cotton in the presence of sodium bicarbonate yielded a violet tint possessing very good properties of wet fastness.

EXAMPLE 2

99 parts (of 65% strength calculated on the sodium salt) of the o.o'-dihydroxyazo-dyestuff free from metal described in Example 1 were dissolved in 1000 parts by volume of water. To the solution 26 parts of chrome alum and 28 parts of crystallized sodium acetate were added and the mixture was boiled under reflux or heated to 125° C. in a closed vessel until the formation of the complex chromium dyestuff was complete. After drying by atomization a dark blue powder was obtained. The dyestuff dyed cellulose fibers in the presence of an acid-binding agent grey blue tints possessing good to very good properties of wet fastness and a very good fastness to light.

EXAMPLE 3

90 parts (of 79.5% strength calculated on the potassium salt) of the monoazo-dyestuff obtainable by coupling diazotized 1 - hydroxy-2-amino-4-N-methyl-N-ethionylaminobenzene with 1-(2'-chloro-6'-methyl-4'-sulfophenyl)-3-methyl-5-pyrazolone were dissolved at 60° to 65° C. in 800 parts by volume of water, stirred for 30 minutes with 24 parts of sodium hydroxide solution of 33% strength for the conversion into the vinyl compound and subsequently 13 parts of acetic acid were added. Then 26 parts of crystallized copper acetate were added and the temperature was maintained at 60° to 65° C. The reaction being complete the complex copper compound was precipitated by the addition of potassium chloride, suctioned off and dried.

The dyestuff obtained dyed cotton in the presence of sodium carbonate yellow brown tints possessing a very good fastness to light and to washing.

EXAMPLE 4

90 parts (of 79.5% strength calculated on the potassium salt) of the azo-dyestuff free from metal described in Example 3 were dissolved at 60° to 65° C. in 800 parts by volume of water, stirred for 30 minutes with 24 parts of sodium hydroxide solution of 33% strength for the conversion into the vinyl compound and 13 parts of acetic acid were added. Then 28 parts of crystallized sodium acetate and 14.5 parts of cobalt sulfate were added and the temperature was maintained at 60° to 65° C. until the formation of the complex dyestuff was complete. By the addition of potassium chloride the complex cobalt compound was precipitated, filtered off and dried. A brown dyestuff powder was obtained with which on cotton in the presence of sodium bicarbonate yellow brown prints possessing a good fastness to washing and a very good fastness to light can be prepared.

EXAMPLE 5

90 parts (of 79.5% strength calculated on the potassium salt) of the azo-dyestuff free from metal described in Example 3 were dissolved in 800 parts by volume of water. Then 28 parts of crystallized sodium acetate and 26 parts of chrome alum were added and the mixture was heated at the boil. It was boiled under reflux until the complex chromium compound had formed. After cooling to 40° to 50° C. the solution was rendered alkaline with sodium hydroxide solution and after the formation of the vinylsulfonamide compound neutralized with hydrochloric acid. Subsequently the dyestuff was salted out, filtered off and dried. The dyestuff was a brown powder which, when printed on cotton in the presence of sodium carbonate, yielded red brown prints possessing a good to very good fastness to light and to wet processing.

EXAMPLE 6

A solution of 228 parts of 1-hydroxy-2-amino-4-N-methyl-N-vinylsulfonylaminobenzene were diazotized at 0° to 5° C., in 1000 parts by volume of water and 1500 parts by volume of 2-N-hydrochloric acid by the addition of 200 parts by volume of 5 N-sodium nitrite solution. The nitrite in excess was removed with amidosulfonic acid. Into the diazonium salt solution adjusted to a pH-value of 5 to 6 a neutralized solution of 188 parts of 1,3-diaminobenzene-4-sulfonic acid in 1500 parts by volume of water was rapidly introduced. The mixture was stirred at 40° to 45° C. until coupling was complete and, by the addition of sodium bicarbonate, a pH-value of 4 to 6 was maintained. The dyestuff was precipitated with sodium chloride, filtered off and dried in vacuo at 50° C.

90 parts (of 50% strength calculated on the sodium salt) of the o-hydroxy-o'-aminoazo-dyestuff obtained were dissolved at 60° to 65° C. in 800 parts by volume of water. Then 28 parts of crystallized sodium acetate and 14.5 parts of cobalt sulfate were added and the mixture was stirred at 60° to 65° until the starting dyestuff could no more be detected. Subsequently the mixture was cooled and potassium chloride was added. The precipitated complex cobalt compound was isolated by filtration and drying. A dark dyestuff powder was obtained which dissolved readily in water to give a brown solution and yielded according to the process described in Example 11(d) a brown cotton print possessing a very good fastness to light and to washing.

EXAMPLE 7

47.9 parts of monoazo-dyestuff obtainable by coupling diazotized 1 methoxy-2-aminobenzene-4-sulfonic acid with 1,3-diamino-4-N-methyl-N-vinylsulfonylaminobenzene were dissolved at 85° to 98° C. in 980 parts by volume of water. Subsequently 19 parts of crystallized sodium acetate and 17 parts of cobalt sulfate were added and the temperature was maintained at 85° to 98° C. until the formation of the metal complex was complete. For isolating the complex cobalt compound the dyestuff solution was evaporated to dryness in vacuo at 40° to 50° C. A dark brown powder was obtained which yielded on cotton in the presence of sodium carbonate brown prints and dyeings possessing very good properties of wet fastness.

EXAMPLE 8

84 parts of the monoazo-dyestuff obtainable by coupling diazotized 1-ethoxy-2-amino-4-N-methyl-N-ethionylaminobenzene with 1-acetylamino - 8 - hydroxynaphthalene-3,6-disulfonic acid were dissolved in 500 parts by volume of water. Then 30 parts of tartaric acid and 25 parts of crystallized copper sulfate were added and the mixture was maintained at a pH-value of 7.0 to 7.5 by the addition of sodium hydroxide solution and at a temperature of 90° to 95° C. The reaction being complete the complex copper dyestuff was isolated by salting out with potassium chloride and suction-filtering. The product obtained was identical with the dyestuff described in Example 1.

Dyeings possessing the same good properties of wet fastness were obtained by using for the preparation of the o-hydroxy-o'-alkoxyazo-dyestuffs the compound of the following formula

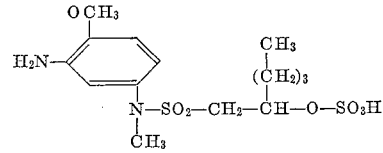

instead of 1-ethoxy-2-amino-4-N-methyl-N-ethionylaminobenzene.

EXAMPLE 9

63.6 parts of the monoazo-dyestuff obtainable by coupling in an alkaline medium diazotized 1-hydroxy-2-amino-4-N-methyl-N-ethionylaminobenzene with 1-hydroxy-6-(3'-carboxy-phenyl) - amino - naphthalene-3-sulfonic acid, were dissolved at 85° to 90° C. in 1500 parts by volume of water. For the conversion into the complex chromium compound 22 parts of crystallized sodium acetate, 27.5 parts of chrome alum and 3.5 parts of sodium carbonate were added in order to adjust the pH-value to 4.5 to 5 and the temperature was maintained at 85° to 90° C. The 1:2-chromium complex being formed, the dyestuff was isolated by drying by atomization. It was a dark powder which was readily soluble in water and dyed cellulose fibers in the presence of sodium hydroxide according to the process described in Example 11 (a to c) marine blue tints possessing a very good fastness to wet processing and to light.

EXAMPLE 10

34.8 parts of the potassium salt of 1-amino-4-N-methyl-N-ethionylaminobenzene were introduced into a mixture of 125 parts by volume of 2 N-hydrochloric acid and 200 parts of ice powder and diazotized with 20 parts by volume of 5 N-sodium nitrite solution. The diazonium salt solution was then introduced into a solution of 15.9 parts of 1-amino-7-hydroxynaphthalene in 115 parts by volume of ice water and 40 parts by volume of 2 N-hydrochloric acid. To the coupling mixture 40 parts by volume of a sodium hydroxide solution of 25% strength were added and the whole was stirred until coupling was complete. The precipitated dyestuff was filtered off, after-washed with ice-cold water and then introduced while stirring into 500 parts by volume of water.

To the dyestuff solution a diazonium salt solution was added which had been prepared from 13.45 parts of 2-aminophenol-4,6-disulfonic acid, 75 parts by volume of 2 N-hydrochloric acid, 100 parts of ice powder and 10 parts by volume of 5 N-sodium nitrite solution. By adding sodium carbonate the coupling mixture was maintained at a pH-value of 6.8 to 7. The coupling being complete 12.5 parts of crystallized copper sulfate were added to the mixture which was after-stirred until the formation of the complex was complete. The dyestff solution was then adjusted with dilute sodium hydroxide solution to a pH-value between 9.0 and 9.5, stirred for some time, weakly acidified with hydrochloric acid, filtered and evaporated to drynes at a pH-value of 5 and at a temperature of 50° to 60° C.

A dark brown powder was obtained which was readily soluble in water and yielded on cellulose fibers in the presence of sodium bicarbonate brown dyeings or prints possessing a good fastness to light and very good properties of wet fastness.

EXAMPLE 11

39.2 parts of the potassium salt of the monoazo-dyestuff obtainable by coupling diazotized 6-chloro-2-aminophenol-4-sulfonic acid with 2-N-methyl-N-vinylsulfonylamino-8-hydroxy-naphthalene-6-sulfonic acid were dissolved in 500 parts by volume of water. After the addition of 40 parts of crystallized sodium acetate and 16 parts of copper sulfate the mixture was stirred at 70° to 75° C. until the formation of the copper complex was complete. The dyestuff was subsequently salted out with potassium chloride, suction-filtered and dried in vacuo at 40° C.

(a) 20 parts of the complex copper dyestuff and 5 parts of sodium hydroxide were dissolved in 1000 parts by volume of water. Cotton fabric was impregnated with this dyestuff solution at 20° C. and subsequently squeezed off to an increase in weight of 80%. The material was rolled on a roller, wrapped in a foil and left on the roller for about 16 hours at 18° to 25° C. while turning the latter. The material was then acidified, rinsed in boiling water and dried.

A claret dyeing possessing a very good fastness to light and to washing was obtained.

(b) 40 parts of viscose rayon fabric were treated for 1 hour at 20° C. while well agitating with 1000 parts by volume of a liquor containing 2.5 parts of the complex copper dyestuff, 50 parts of sodium sulfate and 10 parts of sodium hydroxide. Subsequently the dyeing was rinsed at the boil and dried. The claret dyeing obtained was distinguished by a very good fastness to light and to washing.

(c) 100 parts of cottton fabric were impregnated with an aqueous solution of 3% strength of the complex copper dyestuff and squeezed off to an increase in weight of about 80%. The material thus impregnated was dried, padded with a solution containing per liter of water 250 grams of sodium chloride and 10 grams of sodium hydroxide and squeezed off again until the weight was 200 parts. Subsequently the material was steamed for 30 seconds at 100° to 102° C., rinsed in water and dried.

A claret dyeing possessing a very good fastness to light and to washing was obtained.

(d) A printing paste was prepared by mixing 20 parts of the complex copper dyestuff, 50 parts of urea, 400 parts of an aqueous sodium alginate solution of 5% strength, 500 parts of water and 20 parts of sodium carbonate. With the aid of rollers the printing paste thus obtained was applied to a cotton fabric and after drying steamed for 5 minutes at 101° to 103° C. The fabric was rinsed in water, boiled for 5 minutes in a dilute soap solution, rinsed again in water and dried. A claret print possessing a very good fastness to washing was obtained.

The following table indicates a number of further metalliferous azo-dyestuffs obtainable according to the present invention and the tints of the dyeings or prints obtained with these dyestuffs on cellulose fibers in the presence of an acid-binding agent.

| | Diazo component | Coupling component | Metal | Tint |
|---|---|---|---|---|
| 1 | 1-hydroxy-2-amino-4-N-methyl-N-vinyl-sulfonylaminobenzene. | 2-hydroxynaphthalene-3,6-disulfonic acid | Cu | Claret. |
| 2 | do | 1-benzoylamino-8-hydroxynaphthalene-4,6-disulfonic acid. | Cu | Violet. |
| 3 | do | 2-methylaminonaphthalene-7-sulfonic acid | Co | Grey. |
| 4 | do | 1-acetylamino-8-hydroxynaphthalene-4,6-disulfonic acid. | Cu | Violet. |
| 5 | do | do | Co | Do. |
| 6 | do | do | Cr | Blue grey. |
| 7 | do | 1-hydroxynaphthalene-4-sulfonic acid | Cu | Claret. |
| 8 | do | 2-aminonaphthalene-6-sulfonic acid | Co | Red brown. |
| 9 | do | 1-hydroxy-3-aminobenzene-6-sulfonic acid | Co | Black brown. |
| 10 | do | 2-acetylamino-8-hydroxynaphtahlene-6-sulfonic acid. | Cu | Red violet. |
| 11 | 1-methoxy-2-amino-4-N-methyl-N-vinyl-sulfonylaminobenzene. | 1-acetylamino-8-hydroxynaphthalene-3,6-disulfonic acid. | Cu | Violet. |
| 12 | 1-amino-3-N-n-butyl-N-vinylsulfonylamino-benzene. | 1-hydroxynaphthalene-4-sulfonic acid | Cu | Claret. |
| 13 | 1-hydroxy-2-amino-5-N-methyl-N-vinyl-sulfonylaminobenzene. | 1-hydroxynaphthalene-5-sulfonic acid | Cu | Do. |
| 14 | do | 2-hydroxynaphthalene-8-sulfonic acid | Cu | Red brown. |
| 15 | do | 6-acetylamino-1-hydroxynaphthalene-3-sulfonic acid. | Cu | Claret. |
| 16 | do | 1-hydroxynaphthalene-3-sulfonic acid | Cu | Do. |
| 17 | do | 2-hydroxynaphthalene-6,8-disulfonic acid | Cu | Brown. |
| 18 | do | 1-acetylamino-8-hydroxynaphthalene-3,6-disulfonic acid. | Cu | Violet. |
| 19 | do | 1-phenyl-5-pyrazolone-3-carboxylic acid | Cu | Yelllw brown. |
| 20 | 1-hydroxy-2-amino-4-N-methyl-N-vinyl-sulfonylaminobenzene. 1-amino-4-N-methyl-N-vinylsulfonyl-amino-benzene. | 1,8-dihydroxynaphthalene-3,6-disulfonic acid. | Cu | Blue. |
| 21 | 2-aminophenol-4-sulfonic acid | 2-N-methyl-N-vinyl-sulfonylamino-8-hydroxynaphthalene-6-sulfonic acid. | Cu | Ruby. |
| 22 | do | do | Co | Claret. |
| 23 | do | do | Cr | Violet. |
| 24 | 4-chloro-2-aminophenol-6-sulfonic acid | do | Cu | Red violet. |
| 25 | 4-acetamino-2-aminophenol-6-sulfonic acid | do | Cu | Violet. |
| 26 | 4-nitro-2-aminophenol-6-sulfonic acid | do | Cu | Claret. |
| 27 | 6-nitro-2-aminophenol-4-sulfonic acid | do | Cu | Red violet. |
| 28 | 2-aminobenzoic acid | do | Cu | Red brown. |
| 29 | 2-aminophenol-4-sulfonic acid | 2-N-methyl-N-vinyl-sulfonylamino-5-hydroxynaphthalene-7-sulfonic acid. | Cu | Ruby. |
| 30 | 4-chloro-2-aminophenol-6-sulfonic acid | do | Cu | Red violet. |
| 31 | 2-aminophenol-4-sulfonic acid | 1-(4'-N-methyl-N-vinylsulfonylamino-phenyl)-3-methyl-5-pyrazolone. | Cu | Yellow brown. |
| 32 | 1-amino-4-N-cyclo-hexyl-N-vinylsulfonyl-aminobenzene. | 1-acetylamino-8-hydroxynaphthalene-3,6-disulfonic acid. | Cu | Violet. |
| 33 | 1-hydroxy-2-amino-4-N-methyl-N-vinyl-sulfonyl-aminobenzene. | 1-(4'-β-hydroxyethyl-sulfone-sulfuric acid ester-phenyl)-3-methyl 5-pyrazolone. | Ni | Yellowish brown. |
| 34 | 4-chloro-2-amino-1-hydroxybenzene-6-sulfonic acid. | Secondary condensation product of cyanuric chloride- 1-amino-8-hydroxynaphthalene-3,6-disulfonic acid and 4-amino-1-N-methyl-N-vinylsulfonylaminobenzene. | Cu | Violet. |
| 35 | 6-nitro-2-amino-1-hydroxybenzene-4-sulfonic acid. | Secondary condensation product of cyanuric chloride, 1-amino-8-hydroxy-naphthalene-3,6-disulfonic acid and 4-amino-1-N-methyl-N-vinylsulfonyl-amino-benzene. | Cu | Red violet. |
| 36 | 4-acetamino-2-aminophenol-6-sulfonic acid. | 2-N-butyl-N-vinyl-sulfonylamino-8-hydroxy-naphthalene-6-sulfonic acid. | Cu | Violet. |
| 37 | 1-amino-2-hydroxy-naphthalene-4-sulfonic acid. | 1-acetoacetylamino-4-N-methyl-N-ethionylaminobenzene. | Cr | Red brown. |

We claim:

1. The complex copper compound of the azo-dyestuff having the formula

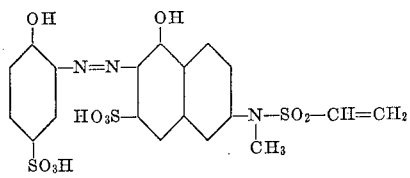

2. The complex copper compound of the azo-dyestuff having the formula

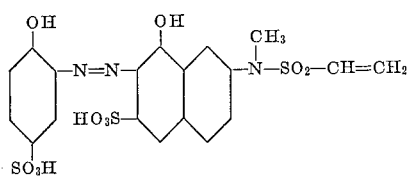

3. The complex copper compound of the azo-dyestuff having the formula

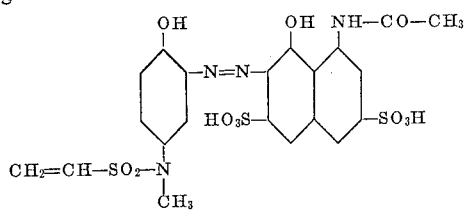

4. The complex cobalt compound of the azo-dyestuff having the formula

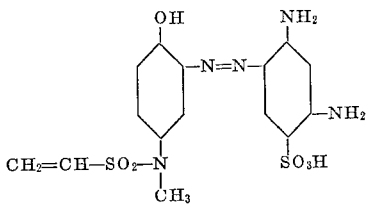

5. The complex copper compound of the azo-dyestuff having the formula

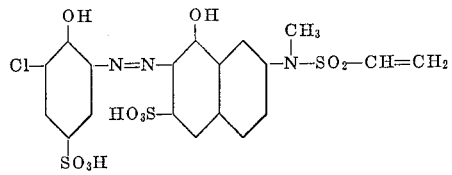

6. The complex copper compound of the azo-dyestuff having the formula

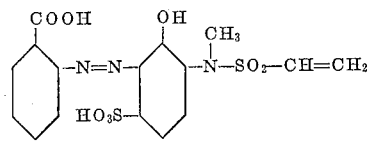

References Cited

UNITED STATES PATENTS

| | | | |
|---|---|---|---|
| 3,007,762 | 11/1961 | Wegmann et al. | 260—151 X |
| 3,135,730 | 6/1964 | Heyna et al. | 260—147 |
| 3,197,456 | 7/1965 | Kühne et al. | 260—163 |

FOREIGN PATENTS 214,547 4/1961 Austria.

CHARLES B. PARKER, *Primary Examiner.*

D. M. PAPUGA, *Assistant Examiner.*

U.S. Cl. X.R.

260—149, 147, 146, 37, 206, 198, 199, 163, 196, 200, 153, 310, 458; 8—42, 54.2, 51